2,887,380
HIGH WET STRENGTH PHOTOGRAPHIC PAPER

William T. Driscoll, William F. Fowler, and Richard J. Hellmann, Rochester, N.Y., assignors to Eastman Kodak Company, Rochester, N.Y., a corporation of New Jersey No Drawing. Application July 7, 1955
Serial No. 520,612

20 Claims. (Cl. 96—85)

This invention concerns a method for imparting high wet strength to paper. More particularly, this invention concerns the use of copolymer hydrosols as beater sizes in photographic paper raw stock.

Photographic papers for the most part must be capable of withstanding a certain amount of handling while wet due to the requirement that the sensitized coating must be processed in photographic solutions. Consequently, various agents are added to the paper pulp from which photographic paper is made in order to add to the wet strength of the finished photographic paper. Some of these photographic papers contain sodium stearate precipitated by the subsequent addition of an aluminum chloride solution, or suitable acid, which is incorporated as a beater size. In addition, wet strength may be improved by the addition of various urea-formaldehyde or melamine formaldehyde resins to the pulp shortly before reaching the wire of the paper machine. The wet strength values imparted to the paper using these condensates are sufficiently high, but it has been found in certain applications that it would be preferable to have a smaller amount of formaldehyde or eliminate it completely.

We have discovered a process for improving the wet strength of photographic paper in which a beater size may be added which does not require the addition or incorporation therein of formaldehyde.

One object of this invention is to provide a photographic paper having high wet strength. Another object of this invention is to provide a hydrosol copolymer beater size which is free from formaldehyde. A further object of this invention is to provide a photographic paper base having high wet strength on which may be applied commercially available tub sizes.

The above objects are obtained by adding to the fiber slurry prior to sheet formation a hydrosol copolymer whose composition is extremely hydrophobic and at the same time cationic. The cationic property aids the addition and binding of the sol to the fibers. We have discovered that certain ratios of n-butyl acrylate, styrene, methacrylamide, and 4-vinylpyridine (as its hydrochloride) may be copolymerized in aqueous emulsion in the presence of a cationic surfactant to yield hydrosols which will both size and impart high wet strength to raw stock. Our preferred embodiment of this invention is about 4 percent 4-vinylpyridine, 16 percent methacrylamide, 28 percent n-butyl acrylate and 52 percent styrene. However, ranges of from 2 to 12 weight percent of 4-vinylpyridine, from 4 to 20 weight percent methacrylamide, from 10 to 50 weight percent of n-butyl acrylate and from 28 to 84 weight percent of styrene may be used.

The examples which follow are intended to illustrate the nature of our invention rather than its scope. All physical test data recorded herein are the average figures for five measurements.

EXAMPLE I

Part A.—Preparation of an n-butyl acrylate-styrene-methacrylamide-4-vinylpyridine hydrochloride hydrosol Ten grams of freshly distilled 4-vinylpyridine were dissolved in 800 ml. of distilled water by addition of dilute hydrochloric acid until the pH was 4.0. Forty grams of methacrylamide were dissolved in this solution, together with 7.5 ml. of a 50% solution of dimethyl-$\beta$-hydroxyethyl-$\gamma$-stearamidopropyl ammonium chloride (hereinafter the solution is referred to by its trade name, Aerosol-SE), and 1.27 grams of potassium persulfate and the temperature was raised to 80° C. At this point, a solution of 7.5 ml. more of Aerosol-SE in 200 ml. of distilled water was added dropwise through one dropping funnel while a solution of 133 grams of styrene and 71 grams of n-butyl acrylate was added through the other. The temperature of the reaction mixture was maintained at 80° C. and the mixture was mechanically stirred during these additions and for 15 minutes thereafter. An opaque hydrosol free of coagulum and having a pH of 3.28 resulted.

Part B.—Sizing procedure with polymeric hydrosol

Twenty milliliters of the hydrosol described in Part A and 100 ml. of 12.5% sodium hydroxide were added with stirring to 6 liters of a 2.25% slurry of Jordanned pulp free of other chemicals. After brief agitation, 70 ml. of 16% aqueous aluminum chloride solution were added to the slurry. This pulp suspension was then briefly stirred to effect good mixing of the chemicals with the pulp and the mixture then made into hand sheets in a Noble and Wood hand-sheet machine.

Another set of hand sheets were made by adding to 6 liters of 2.25% pulp slurry: 86 ml. of a solution containing 1.9% stearic acid plus 2.2 times the stoichiometric amount of alkali, 17 ml. of 2.4% of gelatin solution, 3 grams of starch added as a 6% solution of maximum viscosity, 38 ml. of 16% aluminum chloride solution, and 16 ml. of 7% solution of trimethylol melamine, as wet strengthener. Hand sheets were formed as in the preceding paragraph. These sheets may be regarded as having physical properties suitable as a reference standard.

Part C.—Physical testing of the hand sheets

Both of the sets of hand sheets whose preparation is described in the preceding Part B, were examined by the physical tests regularly applied by paper-makers to their products. Results are summarized in Table I.

Table I.—HAND SHEET RESULTS

| Sizing Materials | Tear | lb./sq. in. Mullen | lb./sq. in. Wet Strength | Seconds Valley Penetration | MIT Folds |
|---|---|---|---|---|---|
| n-Butyl acrylate-styrene-amide-amine sol | 59 | 23 | 7 | 834 | 5 |
| Sodium stearate, gel, starch, melamineformaldehyde resin | 54 | 19 | 5½ | 673 | 3 |

EXAMPLE II.—ENHANCING THE PENETRATION VALUES OBTAINED WITH POLYMERIC HYDROSOLS

Part A.—Sizing procedure

Thirty milliliters of the same hydrosol whose preparation is described in Example I, Part A, were added to 6 liters of 2.25% pulp slurry. After brief mechanical agitation, 12.5 ml. of 16% aqueous aluminum chloride solution were added, the mixture was briefly stirred, and hand sheets were prepared as previously described.

A conventional type comparison experiment was run by adding 172 ml. of the same sodium stearate solution described in Example I, Part B, and 32 ml. of the same wet strengthener referred to in Example I, Part B, to 6 liters of 2.25% pulp slurry, followed by 38 ml. of 16% aluminum chloride solution. Hand sheets were formed as previously described.

Part B.—Physical testing of the hand sheets

Both sets of hand sheets whose preparation is described in Part A, were tested for wet strength and Valley penetration (160 milliamps. current). Results are tabulated below:

| Sizing Materials | lb./sq. in. Wet Strength | Seconds Valley Penetration |
| --- | --- | --- |
| n-Butyl acrylate-styrene-amide-amine sol | 7¼ | 1,725 |
| Sodium stearate, melamineformaldyhyde resin | 9½ | >2,000 |

EXAMPLE III.—EFFECT OF INITIAL pH UPON SHEET PROPERTIES

Part A.—Preparation of polymeric hydrosols

The procedure outlined in Part A, Example I, was repeated four times except that the initial pH of the polymerization mixture was adjusted to pH=4.00, pH=3.25, pH=2.25, and pH=1.75, respectively with dilute hydrochloric acid.

Part B.—Sizing procedure with polymeric hydrosols

Using the procedure described in Example II, Part A, hand sheets were prepared incorporating each of the sols mentioned in this example, Part A.

Part C.—Physical testing of the hand sheets

All four sets of hand sheets whose preparation is described in Part A were tested for wet strength and Valley penetration with results as follows:

| Initial pH of Hydrosol | lb./sq. in. Wet Strength | Seconds, Valley Penetration |
| --- | --- | --- |
| 4.00 | 7¼ | 1,725 |
| 3.25 | 7½ | 1,950 |
| 2.25 | 7 | 1,860 |
| 1.75 | 7 | 1,310 |

Thus an initial pH of 3.25 appears to be the best.

EXAMPLE IV.—USE OF VINYLTOLUENE

Part A.—Preparation of an n-butyl acrylate-vinyl-toluene methacrylamide-4-vinylpyridine hydrochloride hydrosol The procedure of Example I, Part A, was repeated except that commercial vinyltoluene (a mixture of meta and para isomers) was substituted for styrene. The resultant hydrosol was indistinguishable from those made using styrene.

Part B.—Sizing procedure

Hand sheets were sized with this hydrosol in the same manner as described in Example II, Part A, using the hydrosol whose preparation is referred to in this example, Part A.

Part C.—Physical testing of the hand sheets

The hand sheets prepared in presence of a hydrosol containing vinyltoluene were tested for wet strength and Valley penetration with results as follows:

Wet strength _____ lbs./sq. in__ 6
Valley penetration _____ seconds__ 1986

Thus, vinyltoluene may be substituted for styrene.

EXAMPLE V.—USE OF ACRYLAMIDE

Part A.—Preparation of an n-butyl acrylate-styrene-acrylamide-4-vinylpyridine hydrochloride hydrosol The procedure of Example I, Part A, was repeated except that acrylamide was substituted for methacrylamide. The resultant hydrosol had to be incorporated into hand sheets within 24 hours of polymerization because of the tendency of the sol to form a precipitate which could not be redissolved.

Part B.—Sizing procedure

Hand sheets were sized with this hydrosol in the same manner as described in Example II, Part A, using the hydrosol whose preparation is referred to in this example, Part A.

Part C.—Physical testing of the hand sheets

The hand sheets prepared in the presence of the hydrosol containing acrylamide were tested for wet strength and Valley penetration with results as follows:

Wet strength _____ lbs./sq. in__ 6
Valley penetration _____ seconds__ 1695

Thus, acrylamide may be substituted for methacrylamide.

EXAMPLE VI.—CONTROL EXPERIMENTS

Part A.—Preparation of the hydrosols

In order to test the necessity of using an amide as one of the constituents of the quaternary copolymer whose preparation is described in Example I, Part A, this preparation was repeated except the methacrylamide was omitted.

In another experiment, both amide and organic base, 4-vinylpyridine were omitted, and a hydrosol prepared.

Part B.—Sizing procedure

Hand sheets were sized with these hydrosols in the same manner as described in Example I, Part B, using the hydrosols whose preparation is described in this example, Part A.

Part C.—Physical testing of the hand sheets

Both sets of hand sheets were tested as in Example I, Part C, with results as follows:

| Sizing Materials | Tear | lb./sq. in. Mullen | lb./sq. in. Wet Strength | Seconds Valley Penetration | Folds |
| --- | --- | --- | --- | --- | --- |
| n-Butyl acrylate-styrene | 62 | 21 | 3 | 1 | 3 |
| n-Butyl acrylate-styrene-4-vinyl-pyridine | 54 | 21 | 4 | 5 | 3 |

Thus, it is established (when these results are compared with those of Example I, Part C) that all four components are necessary to impart high wet strength and good sizing to hand sheets.

These examples show the general nature of our invention, but to one skilled in the art, it would not be difficult to make substitutions in our indicated formulations and achieve good results similar to ours. For example, 2-vinylpyridine, 2-methyl-5-vinylpyridine, 3-vinylpyridine, 2-vinylquinoline, and 4-vinylquinoline are substances which may be substituted for the 4-vinylpyridine used in our formulations. In place of methacrylamide or acrylamide, N-methylmethacrylamide, N-ethylmethacrylamide, N-($\beta$-hydroxyethyl)methacrylamide, N-methylacrylamide, N-ethylacrylamide, and N-($\beta$-hydroxyethyl)acrylamide might be substituted. Instead of n-butyl acrylate, one could select methyl acrylate, ethyl acrylate, n-propyl acrylate, isopropyl acrylate, isobutyl acrylate, t-butyl acrylate, n-amyl acrylate, n-hexyl acrylate, 2-ethyl hexyl acrylate, n-octyl acrylate, methyl methacrylate, ethyl methacrylate, n-propyl methacrylate, isopropyl methacrylate, n-butyl methacrylate, isobutyl methacrylate, n-amyl methacrylate, n-hexyl methacrylate, 2-ethyl hexyl methacrylate, and n-octyl methacrylate. For the hydrophobic monomer, a number of other substances besides styrene and vinyltoluene may be employed, such as vinyl chloride, vinylidene chloride, halogenated styrenes, alkylated styrenes, acenaphthene, and the like.

The acrylate and methacrylates esters listed above include those which are alkyl and have from 1 to 8 carbon atoms in the alkyl radical. The alkyl radical may be a branched or straight chain.

The testing methods used are those adopted by the Technical Association of the Pulp and Paper Industries, better known as TAPPI, which maintains printed descriptions of these tests. However, additional information on paper testing can be found in C. J. West's "Bibliography of Paper Making." Sutermeister in "Chemistry of Pulp and Paper Making," 1941, John Wiley and Sons, New York, describes various testing methods.

The Mullen test is a measure of bursting strength found by clamping the paper beneath a metal ring which holds it firmly while pressure is applied underneath until it bursts. Accordingly, the test is measured in pounds per square inch. The MIT test of folding endurance employs an instrument in which a strip of paper, clamped under tension between two sets of jaws is folded back and forth until it breaks, the number of folds being indicated on a counter. The strength of the paper is the weight of load required to pull a strip of the paper apart. In the above examples, the width of the strip tested was one inch and the weight employed measured in pounds. For wet strength, the paper had been immersed in distilled water at room temperature followed by measuring the bursting strength in a Minden paper tester in pounds per square inch.

The Valley penetration test recorded in seconds was measured as follows: The Valley penetration test consists of mounting a two-inch square of paper to be tested between two wooden blocks that have been drilled to allow an electrolyte (516 ml. distilled water, 24 g. of NaCl, 60 ml. glycerine) to contact both sides of the paper simultaneously over a circular area of approximately one inch diameter. A potential is applied that allows 200 ma. of current to flow when no paper sample is present. When a paper sample is mounted in the blocks, the time in seconds is noted from the moment the electrolyte is first brought in contact with the paper sample until 160 milliamps. of current flows through the paper sample.

Paper prepared according to our invention is compatible with photographic emulsions containing light-sensitive silver halide salts such as silver bromide, silver chloride and the like.

The following example illustrates the adaptability of our photographic paper base to coating with a light sensitive silver salt emulsion.

Paper prepared according to Example I, in which the hydrosol copolymer comprising N-butyl acrylate, styrene, methacrylamide and 4-vinyl pyridine was added to the paper pulp, was directly sensitized using a washed silver bromide photographic emulsion. The sensitized paper was then tested for quality, surface, emulsion, frill and sensitometric reproducibility. The sensitized paper was found to have been acceptable in all respects. There was no evidence of intensification or desensitization of the emulsion.

We claim:

1. A photographic paper base containing a cationic polymeric hydrosol produced by copolymerizing n-butyl acrylate, styrene, methacrylamide, and 4-vinylpyridine.

2. A photographic paper base containing as a beater size a cationic polymeric hydrosol produced by copolymerizing a vinylpyridine, an alkyl acrylate, and alkyl acrylamide and styrene.

3. A photographic paper base containing a polymeric cationic hydrosol formed by copolymerizing a vinylpyridine, an acrylamide, an acrylate, and styrene in which the vinylpyridine is selected from the class consisting of 2-vinylpyridine, 2-methyl-5-vinylpyridine, 3-vinylpyridine and 4-vinylpyridine.

4. A photographic paper base containing a polymeric cationic hydrosol formed by copolymerizing a vinylpyridine, an acrylamide, an acrylate, and styrene in which the acrylamide is selected from the class consisting of n-ethyl acrylamide and N-(β-hydroxyethyl) acrylamide.

5. A photographic paper base containing a polymeric cationic hydrosol formed by polymerizing a vinylpyridine, an acrylamide, an acrylate, and a styrene in which the acrylate is selected from the class consisting of methyl acrylate, ethyl acrylate, n-propyl acrylate, isopropyl acrylate, isobutyl acrylate, t-butyl acrylate, n-amyl acrylate, n-hexyl acrylate, 2-ethyl hexyl acrylate, n-octyl acrylate, methyl methacrylate, ethyl methacrylate, n-propyl methacrylate, isopropyl methacrylate, n-butyl methacrylate, isobutyl methacrylate, n-amyl methacrylate, n-hexyl methacrylate, 2-ethyl hexyl methacrylate and n-octyl methacrylate.

6. A photographic paper base containing a cationic hydrosol beater size in which substantially the following proportions by weight, 4 percent 4-vinylpyridine, 16 percent methacrylamide, 28 percent n-butyl acrylate, and 52 percent styrene are copolymerized to form the cationic hydrosol.

7. A photographic paper base containing a cationic polymeric hydrosol in which the following proportions by weight, 2–12 percent of 4-vinylpyridine, 4–20 weight percent of methacrylamide, 10–50 weight percent of n-butyl acrylate and from 28–84 weight percent of styrene are copolymerized to form the cationic hydrosol.

8. A photographic paper base containing as a beater size a cationic polymeric hydrosol containing 2 to 12 weight percent of the following composition:

in which R may be vinyl, from 4–20 weight percent of a composition having the following structural formula:

$$RCH{=}CHCONHR'$$

in which R may be H or $CH_3$ and R' may be hydrogen, alkyl having from 1 to 4 carbon atoms, or β-hydroxyethyl, an acrylate having the following structural formula:

$$RCH{=}CHCOOR'$$

in which R may be an alkyl having from 1–8 carbon atoms and R' may be hydrogen or $CH_3$, and from 28 to 84 weight percent of a composition having the following structural formula:

in which R may be vinyl, vinyl chloride or vinyl alkyl.

9. A photographic paper base according to claim 8 on which has been coated an emulsion containing light-sensitive silver halide salts.

10. A process for providing a photographic paper base comprising adding to the paper fiber slurry prior to sheet formation a cationic polymeric hydrosol beater size formed by copolymerizing 2–12 weight percent of 4-vinylpyridine, 4–20 weight percent of methacrylamide, 10–50 weight percent of n-butyl acrylate and 28–84 weight percent of styrene copolymerized in aqueous emulsion.

11. A process of beater sizing photographic paper base comprising adding to the fiber slurry prior to sheet formation a cationic hydrosol formed by the copolymerization of 2–12 weight percent of 4-vinylpyridine, 4–20 weight percent of methacrylamide, 10–50 weight percent of n-butyl acrylate and 28–84 weight percent of styrene, sodium hydroxide and aluminum chloride.

12. A photographic paper base containing as a beater size a cationic polymeric hydrosol containing 2 to 12 weight percent of the following composition:

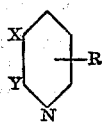

in which R may be vinyl, X and Y are selected from the class consisting of hydrogen atoms and an open ring configuration

so that a naphthalene nucleus is formed having one end of the ring configuration connected at X and the other at Y from 4-20 weight percent of a composition having the following structural formula:

$$RCH=CHCONHR'$$

in which R may be H or $CH_3$ and R' may be hydrogen, alkyl having from 1 to 4 carbon atoms, or $\beta$-hydroxy ethyl, an acrylate having the following structural formula:

$$RCH=CHCOOR'$$

in which R may be an alkyl radical having from 1-8 carbon atoms and R' may be hydrogen or $CH_3$, and from 28 to 84 weight percent of a composition having the following structural formula:

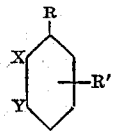

in which R may be vinyl, vinyl chloride or vinyl alkyl, R' may be $CH_3$ or H, and X and Y are selected from the class consisting of hydrogen atoms and an open ring configuration

so that a naphthalene nucleus is formed having one end of the ring configuration connected at X and the other at Y.

13. A photographic paper base according to claim 12 on which has been coated an emulsion containing light-sensitive silver halide salts.

14. A process for providing a photographic paper base comprising adding to the paper fiber slurry prior to sheet formation a cationic polymeric hydrosol beater size formed by coplymerizing 2-12 weight percent of 4-vinylquinoline, 4-20 weight percent of methacrylamide, 10-50 weight percent of n-butyl acrylate and 28-84 weight percent of styrene copolymerized in aqueous emulsion.

15. A process of beater sizing photographic paper base comprising adding to the fiber slurry prior to sheet formation a cationic hydrosol formed by the copolymerization of 2-12 weight percent of 4-vinylquinoline, 4-20 weight percent of methacrylamide, 10-50 weight percent of n-butyl acrylate and 28-84 weight percent of styrene, sodium hydroxide and aluminum chloride.

16. A photographic paper base containing sodium stearate, aluminum chloride and a cationic polymeric hydrosol in which the following proportions by weight, 2-12 percent of 2-vinylpyridine, 4-20 weight percent of N-ethyl methacrylamide, 10-50 weight percent of ethyl acrylate and from 28-84 weight percent of styrene are copolymerized to form the cationic hydrosol.

17. A photographic paper base containing sodium stearate, aluminum chloride and a cationic polymeric hydrosol in which the following proportions by weight, 2-12 percent of 2-methyl-5-vinylpyridine, 4-20 weight percent of N-($\beta$-hydroxyethyl) methacrylamide, 10-50 weight percent of mehtyl acrylate and from 28-84 weight percent of acenaphthene are copolymerized to form the cationic hydrosol.

18. A photographic paper base containing sodium stearate, aluminum chloride and a cationic polymeric hydrosol in which the following proportions by weight, 2-12 percent of 4-vinylpyridine, 4-20 weight percent of methacrylamide, 10-50 weight percent of n-butyl acrylate and from 28-84 weight percent of vinyltoluene are copolymerized to form the cationic hydrosol.

19. A photographic paper base containing sodium stearate, aluminum chloride and a cationic polymeric hydrosol in which the following proportions by weight, 2-12 percent of 4-vinylpyridine, 4-20 weight percent of acrylamide, 10-50 weight percent of n-butyl acrylate and from 28-84 weight percent of styrene are copolymerized to form the cationic hydrosol.

20. A photographic paper base containing sodium stearate, aluminum chloride and a cationic polymeric hydrosol in which the following proportions by weight, 2-12 percent of 3-vinylpyridine, 4-20 weight percent of N-methylacrylamide, 10-50 weight percent of n-hexyl acrylate and from 28-84 weight percent of vinyl chloride are copolymerized to form the cationic hydrosol.

References Cited in the file of this patent

UNITED STATES PATENTS

| | | |
|---|---|---|
| 2,384,632 | MacKenzie | Sept. 11, 1945 |
| 2,394,289 | Boughton | Feb. 5, 1946 |
| 2,448,542 | McQueen | Sept. 7, 1948 |
| 2,491,472 | Harmon | Dec. 20, 1949 |
| 2,646,417 | Jennings | July 21, 1953 |
| 2,718,515 | Thomas | Sept. 20, 1955 |
| 2,721,852 | Fowler | Oct. 25, 1955 |
| 2,748,029 | Spear et al. | May 29, 1956 |
| 2,795,545 | Gluesenkamp | June 11, 1957 |